United States Patent
Yao

(10) Patent No.: US 11,695,635 B2
(45) Date of Patent: *Jul. 4, 2023

(54) RAPID INSTALL OF IOT DEVICES

(71) Applicant: DISH Wireless L.L.C., Englewood, CO (US)

(72) Inventor: Kevin Yao, Cheyenne, WY (US)

(73) Assignee: DISH Wireless L.LC., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/566,171

(22) Filed: Dec. 30, 2021

(65) Prior Publication Data

US 2022/0123995 A1    Apr. 21, 2022

Related U.S. Application Data

(63) Continuation of application No. 16/717,905, filed on Dec. 17, 2019, now Pat. No. 11,362,896.

(51) Int. Cl.
*H04L 41/08* (2022.01)
*H04L 12/66* (2006.01)
*H04L 41/0806* (2022.01)
*H04L 67/125* (2022.01)
*H04L 67/00* (2022.01)

(52) U.S. Cl.
CPC .......... *H04L 41/0889* (2013.01); *H04L 12/66* (2013.01); *H04L 41/0806* (2013.01); *H04L 67/125* (2013.01); *H04L 67/34* (2013.01)

(58) Field of Classification Search
CPC ...... H04L 41/08–41/0889; H04L 12/66; H04L 67/12–67/125; H04L 67/34
See application file for complete search history.

(56) References Cited

U.S. PATENT DOCUMENTS

| | | |
|---|---|---|
| 9,288,228 B2 | 3/2016 | Suumäki |
| 2018/0248983 A1 | 8/2018 | Mohebbi et al. |
| 2019/0149530 A1 | 5/2019 | Ma |

(Continued)

FOREIGN PATENT DOCUMENTS

| | | |
|---|---|---|
| WO | 2018208295 A1 | 11/2018 |
| WO | 2019136044 A1 | 7/2019 |
| WO | 2021126720 A1 | 6/2021 |

OTHER PUBLICATIONS

U.S. Appl. No. 16/717,905, filed Dec. 17, 2019.

(Continued)

*Primary Examiner* — Clayton R Williams
(74) *Attorney, Agent, or Firm* — Wash Park IP Ltd.; John T. Kennedy

(57) ABSTRACT

Devices, systems, and processes for rapid installation of numerous Internet-of-Things (IoT) devices are described. For at least one embodiment, a system for installing multiple Internet-of-Things (IoT) devices may include a multi-device hub communicatively coupled to each of multiple IoT devices. One or more gateways are coupled to the multi-device hub. One or more IoT servers are coupled to at least one of the one or more gateways. The multi-device hub is configured to facilitate a bulk installation of the multiple IoT devices by executing non-transient computer instructions for registering and activating each of the IoT devices with use with one or more IoT servers.

21 Claims, 4 Drawing Sheets

(56) References Cited

U.S. PATENT DOCUMENTS

| | | | |
|---|---|---|---|
| 2020/0005415 A1 | 1/2020 | Schuler et al. | |
| 2020/0177589 A1* | 6/2020 | Mangalvedkar | G06F 16/245 |
| 2020/0177678 A1* | 6/2020 | Livanos | H04L 41/0895 |
| 2020/0186531 A1 | 6/2020 | Bugenhagen | |
| 2020/0244740 A1 | 7/2020 | Ko | |
| 2021/0099349 A1 | 4/2021 | Lee et al. | |
| 2021/0211509 A1* | 7/2021 | Ly | H04L 67/51 |
| 2022/0021674 A1* | 1/2022 | Zafar | H04L 67/12 |

OTHER PUBLICATIONS

EP20839479.1, Communication Pursuant to Rule 161(1) and 162 EPC, dated Jul. 26, 2022.

U.S. Appl. No. 16/717,905, Advisory Action, dated Jan. 13, 2022.

U.S. Appl. No. 16/717,905, Notice of Allowance, dated Feb. 3, 2022.

U.S. Appl. No. 16/717,905, Response to Advisory Action, dated Jan. 13, 2022.

Atilla Nemeth, "Introducing the Oracle IoT Cloud—Part I: Overview", downloaded from the Internet on Dec. 26, 2021 at https://thecattlecrew.net/2015/12/06/introducing-the-oracle-iot-cloud-part-i-overview/.

Atilla Nemeth, "Introducing the Oracle IoT Cloud—Part IV: Forwarding data to external systems", Downloaded from the Internet on Dec. 26, 2021 at https://thecattlecrew.net/2015/12/17/introducing-theoracle-iot-cloud-part-v-forwarding-data-to-external-systems/.

Attila Nemeth, "Introducing the Oracle IoT Cloud—Part II: Device management", The Cattle Crew Blog, pp. 1-8 (Year: 2015).

Laird, "LoRaWAN Keys and IDs Overview", downloaded from the Internet at https://assets.lairdtech.com/home/brandworld/files/LoRaWAN%20Keys%20and%20IDs%20Overview.pdf, 2015, pp. 1-6, Publisher: Lairdtech.

Lora Alliance, "LoRaWAN 1.0.3 Specification", downloaded from the Internet at https://lora-alliance.org/resource-hub/lorawanr-specification-v103, 2018, pp. 1-72, Publisher: LoRa Alliance.

PCT/US20/64718, International Search Report and Written Opinion, dated Mar. 10, 2021.

EP20839180.5, Response to Rule 161 Communication, dated Jan. 26, 2023.

* cited by examiner

RAPID INSTALL OF IOT DEVICES

CROSS REFERENCE TO RELATED APPLICATIONS

This application claims priority to and is a Continuation of U.S. patent application Ser. No. 16/717,905, which was filed on 17 Dec. 2019, in the name of inventor Kevin Yao, and is entitled "Devices, Systems and Processes for Rapid Install of IoT Devices", the entire contents of which are incorporated herein by reference.

TECHNICAL FIELD

The technology described herein generally relates to devices, systems, and processes for rapid installation of numerous Internet-of-Things (IoT) devices.

BACKGROUND

It is anticipated that a connected home, connected business and other locations will adopt, register and activate (collectively, "install") and use multiple dozens if not hundreds of Internet-of-Things (IOT), 5G, narrow band IoT and other devices (collectively, "IoT devices"). Typically, each of these IoT devices will require being installed for use with one or more local and/or remote servers (an "IoT server") executing one or more applications (an "IoT application") to support one or more of monitoring, data reporting, control, user interface, and/or other features and functions (an "IoT function"). A given IoT device may support one or many IoT functions provided by one or more IoT applications hosted by one or more IoT servers. Such IoT functions may require installation with respect to one or many IoT servers.

Further, installation of an IoT device typically involves "registering" the device with an IoT server. Registering typically involves a communication of information regarding a given IoT device, with respect to one or more IoT applications supporting one or more IoT functions, and an association of such IoT device with an account associated with a user. For Registering typically involves a communication of information used for IoT device "personalization" (as further described below). As used herein, a "user" is a person not trained as an electronics, communications, or other technician, such as a homeowner, business owner or other person. However, for one or more embodiments, a user may include an automated, semi-automated, or manual devices, processes, or systems which associate an IoT function with a legal entity.

Installation of an IoT device also commonly includes "activation" of the IoT device. Activation commonly includes operations which configure an IoT device to operate with one or more IoT servers in support of a given IoT function, using a specified communications network. Activation includes establishing one or more communications links between a given IoT device and a given IoT server executing one or more IoT applications. Such communications links arising from use of one or more communications networks and/or systems. One non-limiting example of such a communications system is a communications network such as a local area network, a wide area network, the Internet, a cellular network, a narrow-band IoT network, a 5G network, or otherwise.

Thus, installation of up an IoT device is often device, network and designated IoT application, IoT server, and communications network specific. Installation may require a user to learn multiple operations and perform multiple actions, with such operations and actions often varying based upon IoT server, IoT application, and/or communications network utilized. Without installation, an IoT device will typically not operate, provide, or support its one or more IoT functions.

While the installation of a single or even a few, such as less than ten (10), IoT devices may be manageable (if even then) today by a user, the registering and activation (again, collectively installation) of each IoT device can often consume dozens of minutes for such user. Further, the installation of a first IoT device may vary with respect to the installation of a different IoT device. For IoT devices configured to perform multiple IoT functions, installation may vary be IoT function and may require multiple interactions with multiple IoT servers. Such installations may include a user having to provide different inputs, connect to different communications network, IoT servers, and otherwise to install an IoT device. With the coming explosion and rapid adoption of hundreds of IoT devices in a wide array of products, locations, and the like, currently available IoT device installation processes are often unwieldly, inefficient, repetitive and unmanageable by a user. Accordingly, devices, systems and processes which facilitate rapid installation of multiple IoT devices are needed.

SUMMARY

The various embodiments of the present disclosure describe devices, systems, and processes for the rapid installation of multiple IoT devices. In accordance with at least one embodiment of the present disclosure, a system for installing multiple Internet-of-Things (IoT) devices may include multiple IoT devices, a multi-device hub communicatively coupled to each of the multiple IoT devices, one or more gateways communicatively coupled to the multi-device hub, and one or more IoT servers communicatively coupled to at least one of the one or more gateways. For at least one embodiment, the multi-device hub may be configured to facilitate a bulk installation of the multiple IoT devices by executing one or more non-transient computer instructions for registering each of the multiple IoT devices with at least one of the one or more IoT servers. For at least one embodiment, the computer instructions may include those for activating each of the multiple IoT devices for use with at least one of the one or more IoT servers.

For at least one embodiment, a single of the at least one of the one or more IoT servers may be used for both the registering and the activating of the multiple IoT devices. For another embodiment, different ones of the at least one or more IoT servers may be used for respectively registering and activating the multiple IoT devices.

For at least one embodiment, the non-transient computer instructions for registering may include communicating one or more device parameters, for a given IoT device of the multiple IoT devices, to a given IoT server of the multiple IoT server with which the given IoT device is to register. For at least one embodiment, the one or more device parameters may be received by the multi-device hub from each of the one more IoT devices. For at least one embodiment, the one or more device parameters may include at least one of a device identifier (DevEUI), an application identifier (AppEUI) and an application key (AppKey).

For at least one embodiment, the non-transient computer instructions may include further processing the one or more device parameters received from each of the multiple IoT devices to associate at least one of a common communication parameter and a common application parameter. Such processing may include, as based on the association, identifying common IoT devices. Results arising from the processing operation may be used by the multi-device hub to identify potential IoT servers, from the one or more IoT servers, with which the common IoT devices may register.

For at least one embodiment, the non-transient computer instructions may include communicating an availability request to the potential IoT servers. The availability request may identify an IoT function for the common IoT devices and the IoT function may be specified in the one or more device parameters for each of the common IoT devices. For at lest one embodiment, the IoT function may be associated with an IoT application hosted by the potential IoT servers. For at least one embodiment, the availability request may contain sufficient information for each of common IoT devices to register with the potential IoT servers.

For at least one embodiment, the non-transient computer instructions may include executing a search for IoT servers that supports the IoT function. A result of the search may include an identification of at least one of the potential IoT servers.

For at least one embodiment, the non-transient computer instructions may include receiving an availability response from at least one of the potential IoT servers. The instructions may include selecting, from the received availability responses, one of the potential IoT servers. The instructions may include designating the selected one of the potential IoT servers as the accepted IoT server. The instructions may include communicating a server acceptance to the accepted IoT server. The server acceptance may identify, to the accepted IoT server, the one or more common IoT devices and the IoT functions to be supported by the selected IoT server.

For at least one embodiment, the non-transient computer instructions may include querying the one or more gateways. The instructions may include receiving one or more gateway responses from the one or more gateways queried. The instructions may include selecting, based on the one or more gateway responses, a selected gateway. The instructions may include communicating a gateway acceptance to each of the selected gateway, a selected IoT server, and a selected IoT device of the multiple IoT devices.

For at least one embodiment, the one more gateway responses may include a unique key for providing to a given one of the multiple IoT device and a common key for providing to the multi-device hub and each of the multiple IoT devices to be coupled with the selected gateway.

For at least one embodiment, the gateway acceptance may include an identification of the selected gateway, the selected IoT server and the selected IoT device. The gateway acceptance may include the unique key and the common key. The gateway acceptance may include an identification of a selected network. The selected network may communicatively couple the selected gateway with the selected IoT server. The information provided in the gateway acceptance may be used to facilitate secure communications between the selected IoT device and the selected IoT server using the selected gateway and the selected network. For at least one embodiment, the selected IoT server may be selected during registering of each of the multiple IoT devices with at least one of the one or more IoT servers.

For at least one embodiment, the multi-device hub may be communicatively coupled to at least one of the multiple IoT devices using at least one of a near field communication (NFC) link, a Wi-Fi protected setup (WPS) process, a personal identification number, a code selection process, infra-red signals, and a physical connection.

For at least one embodiment, the one or more IoT servers may be communicatively coupled to at least one of the one or more IoT gateways via a network. Upon completion of installation, each of the multiple IoT devices may communicatively be coupled to a selected IoT server, selected from the one or more IoT servers, via at least one of the one or more gateways and the network.

In accordance with at least one embodiment of the present disclosure, a method for installing multiple IoT devices may include registering each of multiple IoT devices with at least one of one or more IoT servers and activating each of the multiple IoT devices for use with at least one of the one or more IoT servers.

In accordance with at least one embodiment of the present disclosure, a multi-hub device for facilitating multiple IoT device installation may include a communications module, a storage device, a processor, and a data bus communicatively coupling the each of the communications module, the storage device and the processor. The processor may be configured to execute non-transient computer instructions for facilitating bulk installation of the multiple IoT devices by registering each of the multiple IoT devices with at least one of the one or more IoT servers and activating each of the multiple IoT devices for use with at least one of the one or more IoT servers.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments described herein are directed to devices, systems, and processes for rapid installation of multiple IoT devices. As is commonly known and appreciated, each IoT device will typically be compatible with one or more communications technologies to facilitate the communication data relating to the IoT device's given IoT functions with one or more IoT applications being executed by one or more Iot servers. Various communications technologies may be used to facilitate IoT functions and non-limiting examples include and/or span from limited range communications technologies to long range technologies, and others. Non-limiting examples of limited range communications technologies include Bluetooth®, near-field communications (NFC), Zigbee, IEEE 802.11, and others. Non-limiting examples of long-range technologies used to support IoT functions include long range, low power wide area network technologies such as LoRaWAN, which has been promulgated by the LoRa Alliance, Inc. Herein, one or more various embodiments of the present disclosure are described in conjunction with a LoRaWAN implementation, but the various embodiments of the present disclosure are not to be construed as being so limited. Other implementations may be used for other embodiments including, but not limited to, SigFox, NB-IoT, 5G and others.

Figure 1:
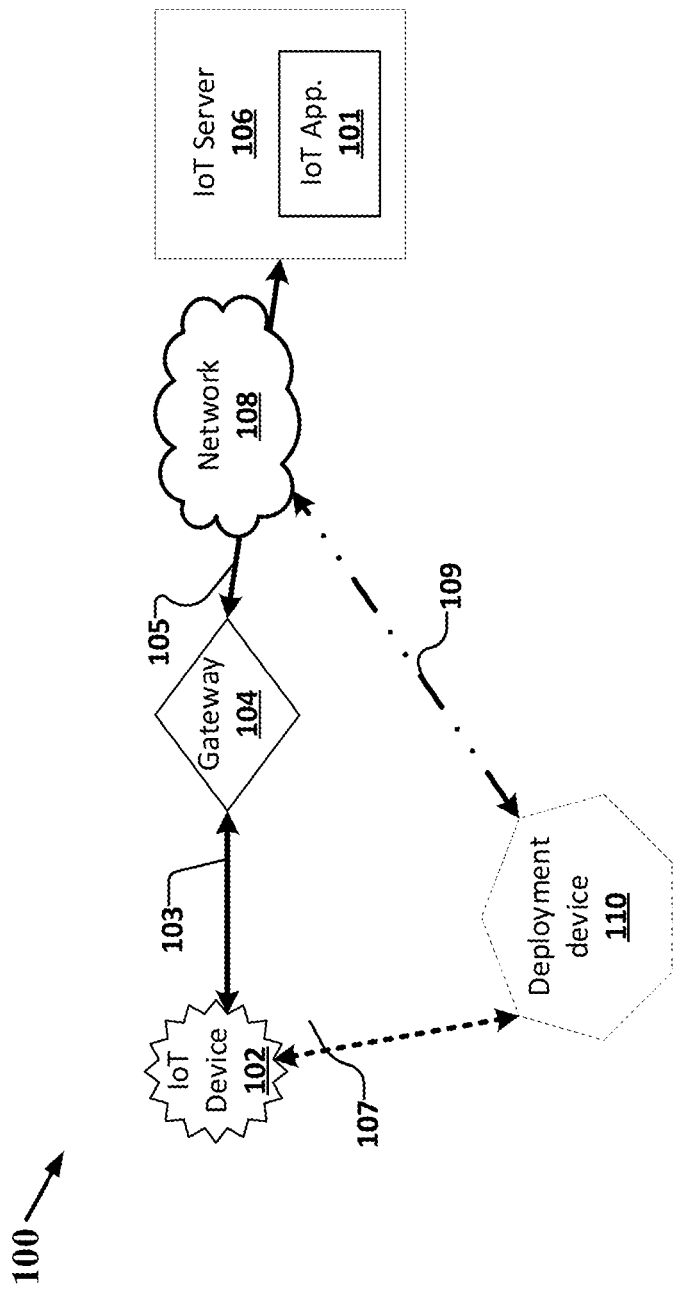
FIG. 1 is a schematic representation of a system used to facilitate installation of a single IoT device in accordance with a prior art embodiment.

As shown in FIG. 1, an IoT device 102 may use one or more communications technologies to communicate data between itself and a given destination such as an IoT application 101 being executed by an IoT server 106. The IoT server 106 supporting the providing of at least one IoT function, via the IoT application 101, by a given IoT device 102, when such device has been installed. For at least one embodiment, an IoT server 106 may be any device, application, sever, or system configured to receive, process, send and otherwise attend to data, execute computer instructions (as further defined below), execute commands and/or other information by and between one or more IoT devices 102 in support of one or more IoT functions.

Herein, communications between an IoT device 102 and an IoT server 106 are referred to herein as each being an "IoT communication." To facilitate such IoT communications, one or more gateways 104 and networks 108 may be used. As used herein a "gateway" 104 is a device or system that facilitates IoT communications between an IoT device 102 and an IoT server 106 using at least one network 108. A gateway 104 may facilitate such IoT communications, in whole or in part, using a first communications link 103. The first communications link 103 may use long range technology that communicatively couples a given IoT device 102 with a given gateway 104. An IoT server 106 may also be communicatively coupled to the gateway 104, via the network 108, using a second communications link 105. The second communications link 105 may use the same or different communications technologies as are used to connect a given IoT device 102 with the given gateway 104.

It is to be appreciated that to establish the communications links between a given IoT device 102, a gateway 104, and an IoT server 106, using a communications network 108 an identification and authorization process is commonly used by and between each element of the system. For example, for a LoRaWAN implementation, to install an IoT device 102, personalization and activation processes may be used. Commonly, an Over-the-Air ("OTA") activation process may be utilized. Such OTA activation process is described below. Other processes include use of activation by personalization wherein a given IoT device is pre-configured for use with a given network and the unique security keys used to secure communications between the IoT device and a given IoT server, using a given network, are pre-loaded onto the IoT device. Activation by personalization is not specifically addressed herein, but the description provided herein may be applied to an activation by personalization installation process, when desired for a given implementation of an embodiment of the present disclosure.

More specifically for OTA activation of a single device, personalization of an IoT device 102 includes an identification of a device identifier (a "DevEUI"), an application identifier (an "AppEUI"), and an application key ("AppKey") with a given IoT server 106, and a communications network 108. Personalization may also be referred to as IoT device 102 registration. A DevEUI is a globally unique character string that uniquely identify a given IoT device 102. Each IoT device 102 has a unique DevEUI, which is provided at the time of manufacture of such device. An AppEUI is a string of characters that uniquely identify a given application globally. An AppKey is an AES-128 root key specific to the IoT device 102. To register, each of the gateway 104, network 108, and IoT server 106 providers must be informed of the IoT device 102 personalization information and associated with a user account.

After registration and when an IoT device 102 joins a network 108, the AppKey is used to derive a network session key ("NwkSKey") and an application session key ("AppSKey"). These keys are used to facilitate secure communications between the given IoT device 102 and the given IoT server 106, via the gateway 104 and network 108.

Further, installation of an IoT device 102 for use in a non-limiting LoRaWAN implementation, using an OTA activation, consists of a communication of at least two messages between the IoT device 102 and the IoT server 106. First, a non-encrypted "Join-request" message is sent by the IoT device 102. The Join-request message includes the AppEUI, the DevEUI, and a DevNonce packet. The DevNonce is a random value that the IoT server 106 uses to keep track of prior join requests and prevent replay attacks. Second, if a join request is accepted by the IoT server, an encrypted "Join-accept" message is sent. The Join-accept message includes an application nonce ("AppNonce"), a network identifier ("NetID"), an end-device address ("DevAddr"), and various other communications settings. The AppNonce is a random value that can be used to derive the NwkSKey and the AppSKey (as identified above). This currently available process is well known in the art and is further described in the "LoRaWAN 1.0.3 Specification," dated 2018, provided by the LoRa Alliance, Inc. and downloadable from the Internet at https://lora-alliance.org/lorawan-for-developers, the entire contents of which are incorporated herein by reference.

It is to be appreciated, that an IoT device 102 typically goes through the above request-accept procedures every time session context information is lost and OTA activation is desired. When multiple IoT devices 102 are used, it is to be appreciated that registration and an OTA activation process can be quite cumbersome.

Today some prior art implementations use one or more "deployment devices" 110 devices to facilitate OTA activation. The deployment device 110 may be communicatively coupled to the given IoT device 102 by a third communications link 107, and with the network 108 104 by a fourth communication link 109. The third communications link 107 often uses either a direct, wired connection, or a limited range communications technology, such as NFC. The fourth communications link 109 may use a longer-range connection, a broadband connection, or the like. The deployment device 110 is often used to provide serials registration and activation of IoT devices. That is, each OTA activation of an IoT device occurs individually with unique third communications links 107 being established between each IoT device 102 and the deployment device 110 and unique fourth communications links (e.g., unique channels or sessions) being established between the deployment device 110 and the network and IoT server 106. When multiple IoT devices are to be activated, such processes often become overwhelming and inefficient to a user.

In accordance with at least one embodiment of the present disclosure, a rapid install of a multiple IoT devices 102 is facilitated by use of a hub 210.

Figure 2:
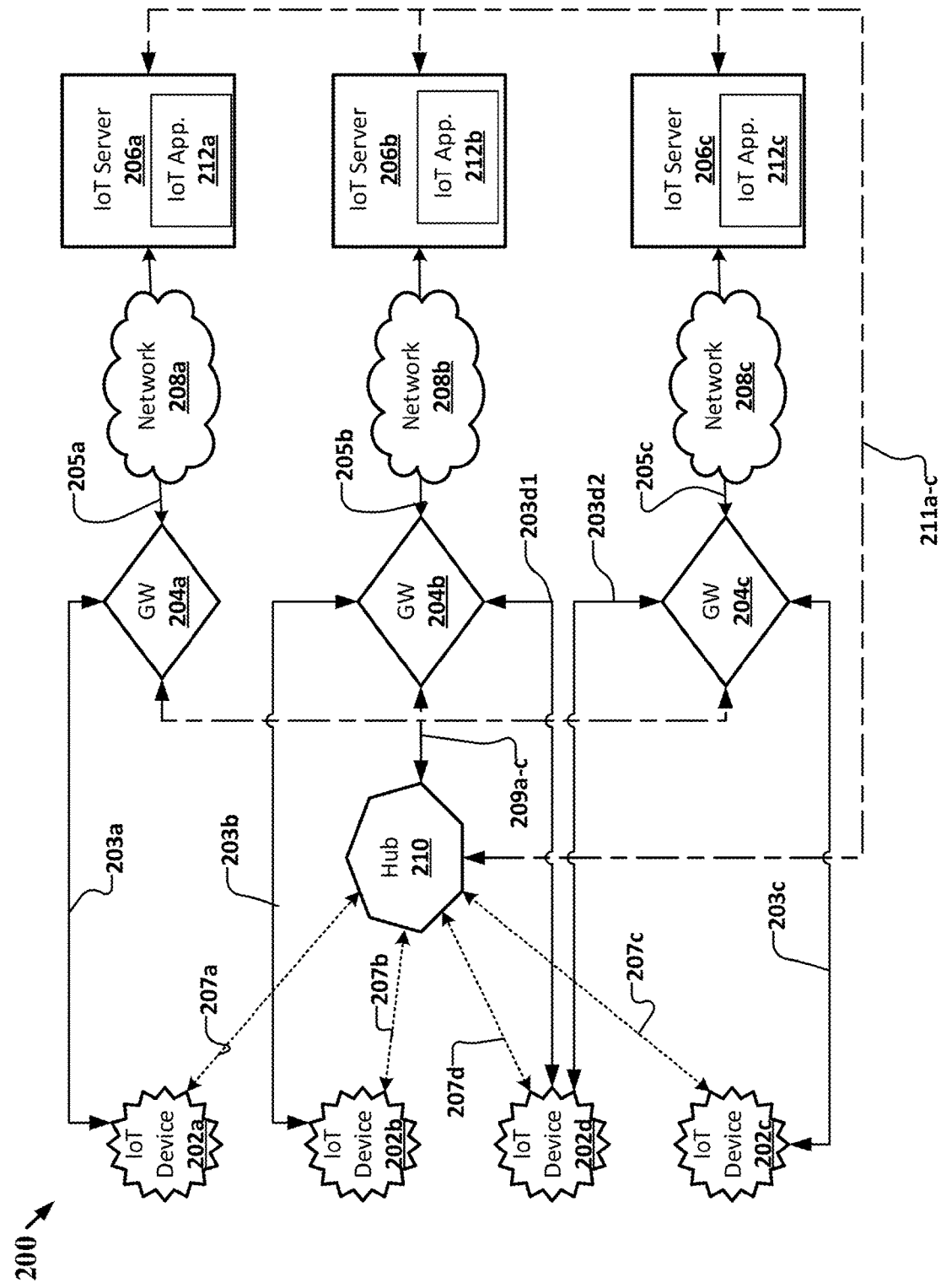
FIG. 2 is a schematic representation of a system configured to facilitate rapid installation of multiple IoT devices and in accordance with at least one embodiment of the present disclosure.

As shown in FIG. 2 and for at least one embodiment of the present disclosure, a system 200 for facilitating a rapid install of numerous IoT devices 202a-n includes various system components. Such system 200 components may include two or more IoT devices 202, one or more gateways ("GW") 204 communicatively coupled via one or more networks 208 with one or more IoT servers 206. Each IoT server 206 facilitates at least one IoT function as provided by and/or in conjunction with an IoT application 212. As shown, upon activation, each connection of an IoT device 202, via gateway 204 and a network 208, with an IoT server 206 forms a unique channel/session. The system 200 also includes a multi-device hub 210 configured to facilitate multiple IoT device 202 registration and activation. The multi-device hub 210 may also be configured to monitor and configure each channel/session between a given IoT device 102 and a given IoT server 206 and without requiring each IoT device 102 to individually engage in Join-Request and Join-Accept message transmissions, such as when LoRaWAN or similar technologies are utilized, or to establish unique communications links for registration and activation of each IoT device 102.

Figure 3:
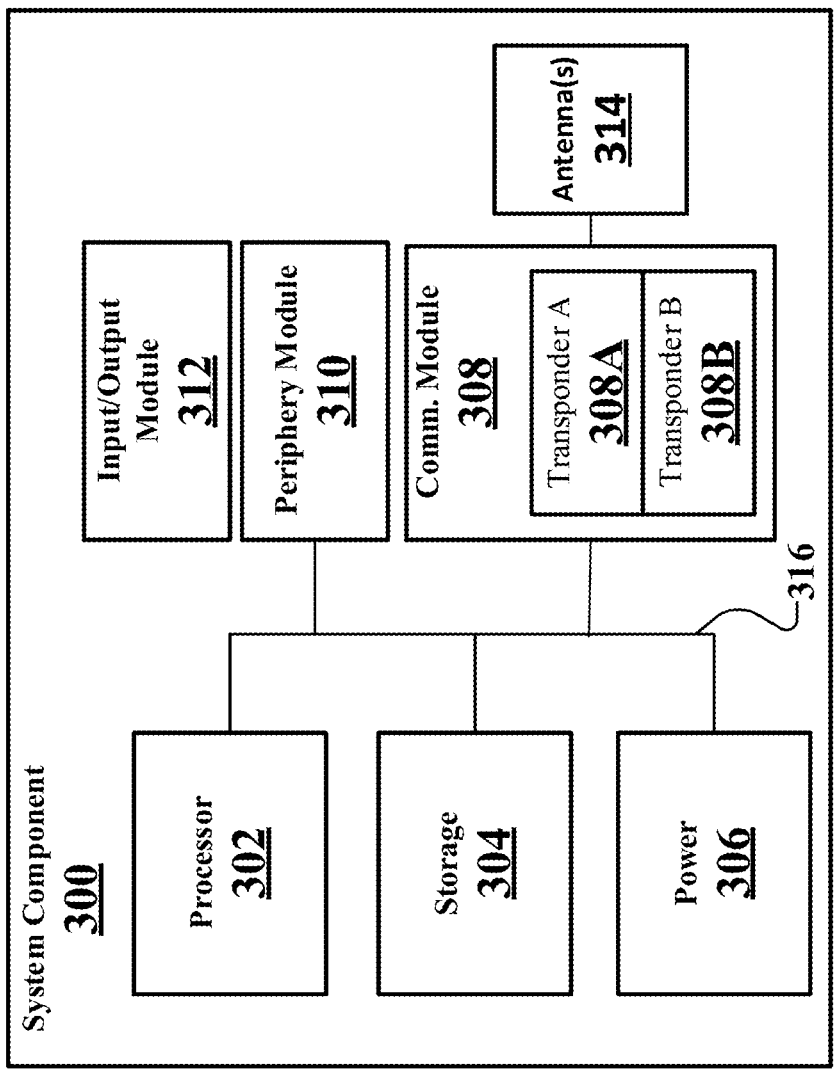
FIG. 3 is a schematic representation of a system component, as defined below, and as configured in accordance with at least one embodiment of the present disclosure.

For at least one embodiment, the IoT devices 202, gateway 204, IoT Server(s) 206, networks 208, and multi-device hub 210 may each be configured to include one or more components as shown in FIG. 3 which facilitate and support the installation processes described herein and the one or more IoT functions provided by a given IoT sensor 202.

As shown in FIG. 3, an IoT device 202, gateway 204, IoT server 206, network 208 and/or multi-device hub 201 may be configured as "system component" 300 to include a hardware processor 302 (herein a "processor"), a storage module 204, a power module 306, a communications module 308, a sensor module 610, an input/output module 312 and an antenna 314 or other data communications port. It is to be appreciated that an embodiment of a system component 300 may include any combination of the foregoing and additional components, as desired, while remaining consistent with an embodiment of the present disclosure.

For at least one embodiment, the processor 302 may be any single or combination of processing devices including, but not limited to, a general-purpose processor, a special purpose processor, a digital signal processor (DSP), a controller (micro or otherwise), an application specific integrated circuit (ASIC), or any other type of integrated circuit or combinations thereof. For at least one embodiment, the processor 302 may include one or more hardware processors, such as 32-bit and 64-bit central processing units, multi-core ARM based processors, microprocessors, microcontrollers, and otherwise. The data processing operations executed by the processor 302 may include one or more non-transient computer executable instructions. The non-transient computer executable instructions may include instructions for executing one or more applications, engines, and/or processes configured to perform computer executable operations (hereafter, "computer instructions"). The hardware and software technologies provided by the processor 302 and the computer instructions may arise in any desired computing configuration including, but not limited to, local, remote, distributed, blade, virtual, or other configurations and/or systems configured for use in support of the one or more embodiments of the present disclosure. The computer instructions may be suitable stored or otherwise provided to the processor 302 for execution thereby as desired for any given embodiment. Such computer instructions may be executed by the processor 302 in support of any function of a device.

The computer instructions may be stored and/or provided in a storage device 304, provided with the processor 302 itself, such as in cache or read only memory, as firmware, accessible from a remote source, or otherwise. The processor 302 may be separated into one or more logical processing elements that execute computer instructions to facilitate the various features and functions of a system component 300, as so configured in accordance with one or more embodiments of the present disclosure. Non-limiting examples of such features and functions supported by the processor 302 may include data processing, communications circuit control, security, device maintenance and monitoring, and any other function or feature provided, supported and/or executed by a system component 300.

It is to be appreciated that one or more system components 300 may be legacy devices and/or systems that have been configured to execute the computer instructions via one or more downloads, device/system updates, installs, add-on hardware or software modules or otherwise. It is also to be appreciated that a system component 300 may also and/or alternatively be new devices specifically configured to facilitates use of the rapid installation processes described herein. Thus, it is to be appreciated that implementation of an embodiment of the present disclosure may be accomplished using known or existing devices and systems that have been configured, in accordance with at least one embodiment described herein, to execute computer instructions supporting the rapid IoT device installation processes described herein.

One or more storage devices 304 may be used and configured to store one or more data sets, such data sets may include one or more computer instructions. Such data sets may be generated based upon actual use of a given system component 300, such as actual use of an IoT sensor 202 or other data provided to or generated by an IoT sensor or any other system component 300. Such data sets may be provided during an initial set-up and/or initial use of a given system component 300, may be generated during registration, activation, use or other operations regarding a system component 300. The storage device(s) 304 may have any form known in the art or later arising removable or non-removable storage component. Non-limiting examples of storage components that may be used herewith include random-access memory, read-only memory, flash memory, memory sticks, secure digital memory cards, compact flash memory cards, subscriber identity module (SIM) cards, electronic SIM cards (also referred to as eSim cards), and others. One or more storage devices 304 may be provided with, local to, or remote from a given system component 300.

In accordance with at least one embodiment of the present disclosure and as perceived by each given IoT device 202, execution of the respective computer instructions facilitate the processes and communications described herein which facilitate an IoT device-by-IoT device installation. That is, from the perspective of a given IoT device 202, computer instructions facilitate IoT device installation may appear to be individualized.

In accordance with at least one embodiment of the present disclosure and as perceived by each gateway 204, execution of one or more of the respective computer instructions facilitate the processes and communications described herein which facilitate a multiple IoT device by multiple IoT device install process. From the perspective of a given gateway, while numerous IoT devices 202 are being installed, via the multi-device hub 210 and in parallel using multiple gateways 204, each IoT device 202 set-up is individualized and may occur in one or more parallel operations managed by the multi-device hub 210. Such parallel operations may occur simultaneously and/or substantially simultaneously such that a given gateway 204, as limited by such device characteristics, may install multiple IoT devices 202 at substantially the same time, even though a single, multi-device hub 210 is being utilized to facilitate such multiple IoT device installations. It is to be appreciated that by facilitating such substantially simultaneous installations, utilization of a given gateway 204 may be managed by the multi-device hub 210 to minimize risks of gateway or network overloading, session terminations, prohibit undesired session reinitializations, and the like.

As perceived by a given user, the one or more computer instructions executed in accordance with at least one embodiment of the present disclosure by a multi-device hub 210, facilitate a bulk, and rapid installation of numerous IoT devices 202 with one or more IoT servers 206, using a multi-device hub 210, one or more gateways 204, and one or more networks 208.

As further shown in FIG. 3, a system component 300 may include a power module 306. The power module 306 may include use of any known or later arising power technologies. Non-limiting examples of such power technologies include batteries, solar arrays, power converters, line power sources, fuel cells, and the like.

As further shown in FIG. 3, a system component 300 may include one or more communications modules 308. Such communications modules 308 may be further configured to include one or more transponders, such as transponder A 308A and transponder B 308B. Transponder A 308 may be configured to support communications using limited range communications technologies, while transponder B 309B may be configured to support communications over long range communications technologies. The communications module 308 may also be communicatively coupled to one or more internal and/or external antennas 314. The antenna(s) 314 may be static, beam forming, dynamic, or otherwise configured. For at least one embodiment, the antenna(s) 314, transponder(s) 308 and/or other known and commonly arising elements of a communications module 308 may be configured to support any desired frequency ranges, protocols, modulation schemes, encryption technologies, data security protocols and/or the like.

As further shown in FIG. 3, a system component 300 may include a periphery module 310. The periphery module 310 may be configured to be communicatively coupled with any additional peripheral element. A peripheral element may be integrated with and/or provided separately with respect to any given system component 300. For example, an IoT device 202 may include one or more sensors as a peripheral element. Non-limiting examples of sensors include temperature, soil, moisture, wind, and other environmental sensors. The periphery module 310 may be used to communicatively couple such sensor(s) to other components, such as the processor 302.

As further shown in FIG. 3, a system component 300 may include an input/output module 312. The input/output module 312 may be utilized for interchanges of data and/or instructions by and between a human. Any currently available and/or later arising input/output devices may be used for a system component 300, as desired for a given embodiment. Non-limiting examples of input devices that may be used include keyboards, mouse, touch screens, voice command components, gesture command components, brain wave detection components and the like. Non-limiting examples of output devices that may be used include speakers, earbuds, visual displays, holographic displays, augmented reality system, virtual reality systems, motion/vibration inducing systems, and the like.

Last, one or more of the above components may be communicatively coupled to one or more other device components by use of a data bus 316 or the like. Any know or later arising data bus 316 technologies may be used including those that use electrical, optical, radio frequency, or other technologies.

Referring again to FIG. 2, for at least one embodiment of the present disclosure the rapid installation of multiple IoT devices 202 may result in first communications links 203*a-c* being established by and between respective IoT device 202*a-d* and gateways 204*a-c*. Second communications links 205*a-c* may be established between the gateways 204*a-c* and the respective servers 206*a-c* using respective networks 208*a-c*. Third communications links 207*a-c* may be established between IoT devices 202*a-d* and the multi-device hub 210. Fourth communications links 209*a-c* may be established between the multi-device hub 210 and the respective gateways 204*a-c*. Fifth communications links 211*a-c* may be established between the multi-device hub 210 and respective IoT servers 206*a-c*.

Further, installation of a first IoT device 202*a* may include the multi-device hub 210 establishing a first session 203*a*-205*a* by and between the first IoT device 202*a* and the first IoT server 206*a* using a first gateway (GW) 204*a* and a first network 208*a*.

Further, a rapid installation of multiple IoT devices 202 may result in communications links being established by and between a second IoT device 202*b* and a second IoT server 206*b*. Installation may include the multi-device hub 210 establishing a second session 203*b*-205*b* by and between the second IoT device 202*b* and the second IoT server 206*b* using a second gateway (GW) 204*b* and a second network 208*b*.

Further, a rapid installation of multiple IoT devices 202 may result in communications links being established by and between a third IoT device 202*c* and a third IoT server 206*c*. Installation may include the multi-device hub 210 establishing a third session 203*c*-205*c* by and between the third IoT device 202*c* and the third IoT server 206*c* using a third gateway (GW) 204*c* and a third network 208*c*.

Further, a rapid installation of multiple IoT devices 202 may result in communications links being established by and between a fourth IoT device 202*d*, which may be a multiple IoT function device, and each of the second IoT server 206*b* and the third IoT server 206*c*. The second IoT server 206*b* and the third IoT server 206*c* may each be configured to support multiple IoT sessions, services, applications or the like, with each such IoT session, service, application and the like being provided to facilitate an IoT function provided by one or more of the second IoT device 202*b*, the third IoT device 202*c* and the fourth IoT device 202*d*. Installation may include the multi-device hub 210 establishing multiple third sessions. A first-third session 203*d*1-205*b* may be established by the multi-device hub 210 by and between the fourth IoT device 202*d* and the second IoT server 206*b* using the second gateway 204b and the second network 208b, and a second-third session 203d2-205c may be established by the multi-device hub 210 by and between the fourth IoT device 202d and the third IoT server 206c using the third gateway (GW) 204c and the third network 208c.

As shown, the multi-device hub 210 may be configured to facilitate establishment of the above-mentioned sessions by utilizing respective third communications links 207a/b/c/d established between each IoT device 202a-d and the multi-device hub 210 and one or more fourth communications links 209 established between the multi-device hub 210 and the one or more gateways (GW) 204a-c. The fourth communications links 209 may provide for communications between the multi-device hub 210 and one or more gateways 204 for establishing one or more sessions between an IoT device 202 and an IoT server 206 in support of at least one IoT function.

For at least one embodiment of the present disclosure, a multi-device hub (210) may be preloaded with activation information provided by a provider of a given IoT device. The provider of the given IoT device may be configured to pre-authenticate the given IoT device with one or more IoT servers 206. Such pre-authentication may occur, for example, upon purchase of the given IoT device by a purchaser thereof. For at least one embodiment, pre-activation may occur during transit of such given IoT device from the provider to the purchaser. Further, the IoT sever(s) 206 may accomplish any needed authentication, including but not limited to Operations 402-416, as described below with respect to FIG. 4. Accordingly, when the given IoT device 206 is desired to be activated, the process of FIG. 4 may resume with operations 418 and thereafter.

Figure 4:
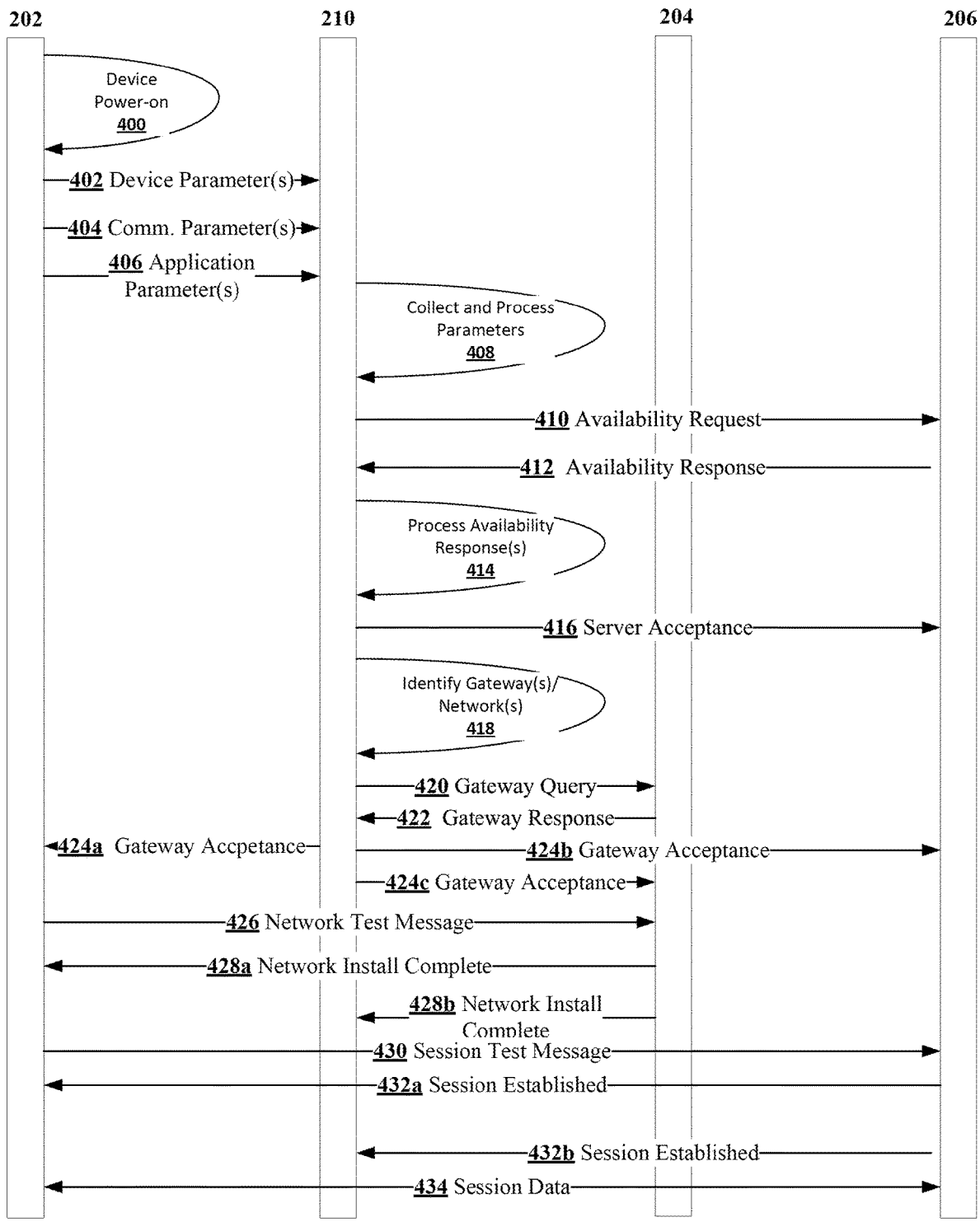
FIG. 4 is a flow chart representing a process for installing multiple IoT devices and in accordance with at least one embodiment of the present disclosure.

As shown in FIG. 4, a process by which a multi-device hub 210 may be utilized to establish one or more the above-mentioned sessions and/or other sessions begins with each IoT device 202 (to be connected for a given session) being powered-on. (Operation 400) It is to be appreciated that for certain IoT devices, powering-on such device may be unnecessary as the device may be configured to always be powered on or to be in a sleep-mode or other "resting" state, in which that given IoT device listens for and upon receiving an activation signal, such as an NFC signal or the like, enters into a non-sleep mode operating state. Further, as used herein, an IoT device that has been "powered-on" is one that is ready to establish a communications link, wired, wireless, or otherwise, with the multi-device hub 210.

At a user desired time, the process continues with device parameters being communicated to the multi-device hub 210 from each powered-on IoT device 202. (Operation 402) For at least one embodiment, the device parameters include a DevEUI. For at least one embodiment, the device parameters may include an identification of a corresponding IoT server 206 configured to support one or more IoT functions provided by the given IoT device 202.

The process may also include each IoT device 202 communicating one or more communications parameters to the multi-device hub 210. (Operation 404) Such communications parameters may identify one or more frequency ranges, channels, modulation techniques, networks or other information that identifies, to the multi-device hub 210, a communications network 208 which the IoT device 202 is to be configured to utilize to communicate with one or more IoT servers 206. For example, communications parameters may specify than a given IoT device may be configured to utilize one or more of a NB-IoT communications network, a LoRaWAN network, a Sigfox network or another network.

The process may also include each IoT device 202 communicating one or more application parameters to the multi-device hub 210. (Operation 406) The application parameters may specify the IoT function, IoT server(s) 206 and/or IoT applications 212 with respect to which the given IoT device 202 desires to be installed. It is to be appreciated that a given IoT device 202 may be provided, from a manufacturer, retailer, or otherwise, for use with one or more IoT functions, IoT servers 206 and/or IoT applications 212. For example, an IoT device 202 configured for use in reporting wind conditions may be configurable for use with a variety of IoT servers used in weather reporting and/or prediction, such as IoT servers provided by a governmental body such as the U.S. National Weather Service, or a local/private body, such as a local television station providing its own weather collecting and/or reporting services. Likewise, a given IoT device 202 may be configurable to report multiple weather data sets, such as temperature, humidity, barometric pressure, rainfall amounts, and otherwise. One or more (or less) of such data points may be used to support a given IoT function, such as lawn sprinkler control, and other functions, such as weather reporting. Thus, Operation 406 may include any combination or permutation of identifiable IoT functions, IoT servers 206 and/or IoT applications 212 that a given IoT device 202 may be configurable to support. Further, such application parameters may include an indication of which IoT functions the user desires for the given IoT device 202 to support—such IoT functions may be less than all those which a given IoT device may be configurable to support. Further, it is to be appreciated that a given IoT device 202 may or may not know which IoT server(s) and/or IoT application(s) are configured and/or available to support one or more IoT functions.

It is to be appreciated that the communications of device parameters, communications parameters and application parameters from one or more IoT device 202 to the multi-device hub 210 may occur at any given time and using a third communications link 207 established between a given IoT device 202 and the multi-device hub 210. As shown in FIG. 2, multiple third communications links 207a-c may be used.

For at least one embodiment, the communication of one or more parameters from one or more IoT devices 202 to the multi-device hub 210 may occur using a third communications link 207 established using NFC communications technologies. Such NFC communications link may be established using known and/or later arising NFC processes. For least one embodiment, one or more of the parameters may be communicated by an IoT device 202 to the multi-device hub 210 using one or more QR codes or the like. The QR code may be provided on a chassis for an IoT device 202, provided in literature associated with the IoT device 202, or otherwise provided. The multi-device hub 210 may be configured to scan such QR code(s) directly or receive information provided in such QR code(s) for a periphery device or otherwise, such as from an Internet server providing data associated with a given QR code.

For at least one embodiment, the communication of one or more parameters from one or more IoT devices 202 to the multi-device hub 210 may occur using a third communications link 207 established in response to a query initiated by the multi-device hub 210. For example, a Wi-Fi Protected Set-up ("WPS") process may be used on one or more of the IoT device(s) 202 and the multi-device hub 210. As is well known in the art, using WPS the multi-device hub 210 may broadcast configuration information that, upon selection of a real or virtual WPS button on a given IoT device 202, results in an exchange of information used to establish a secure connection between the multi-device hub 210 and the given IoT device 202.

For at least one embodiment, the communication of one or more parameters from one or more IoT devices 202 to the multi-device hub 210 may occur using a third communications link 207 established using a personal identification number ("PIN") that a user of an IoT device 202 may enter, directly or using a periphery, and communicate from the IoT device 202 to the multi-device hub 210. Upon correct entry of the PIN, a third communications link between the given IoT device 202 and the multi-device hub 210 may be established.

For at least one embodiment, the communication of one or more parameters from one or more IoT devices 202 to the multi-device hub 210 may occur using a third communications link 207 established using a code selection process. For this embodiment, the multi-device hub 210 may generate a number of unique codes, such as, but not limited to, four codes. The codes may include hexadecimal characters of any desired length. One or more of the codes may be utilized by an IoT device 202 to create a public-private key exchange with the multi-device hub 210 and such key exchange may be used to secure communications between the given IoT device 202 and the multi-device hub 210 over the third communications link.

For at least one embodiment, the communication of one or more parameters, such as one or more infra-red (IR) parameters, from one or more IoT devices 202 to the multi-device hub 210 may occur using a third communications link 207 established using a physical connection between each of the IoT devices 202 to be installed and the multi-device hub 210. Such physical connection may occur using one or more communications networks, such as a local area network, or the like. Accordingly, it is to be appreciated that the communication of one or more of the parameters from an IoT device 202 to the multi-device hub 210 is not limited and, for at least one embodiment, may include use of any known or later arising process for communicating data from a first device to a second device using limited range communications technologies.

As per Operation 408, the multi-device hub 210 collects and processes the parameters received from the two or more IoT devices 202. Such collection and processing may occur at any time, iteratively, repeatedly, repetitively, or otherwise. For at least one embodiment, the multi-device hub 210 may be configured to identify and associate those one or more IoT devices 202 based on provided common communication parameters and/or common application parameters. For example, the multi-device hub 210 may be configured to identify certain IoT devices as to be installed with respect to a given IoT server, a given IoT application (which may be replicated across multiple servers), using a given network 208 or otherwise. Such common association may be used later in the process of the embodiment depicted in FIG. 4 to facilitate efficient communications by and between the multi-device hub 210, one or more network 208 components, one or more IoT servers 206 and/or one or more IoT applications 212 executing one or more IoT servers 206.

As per Operation 410, the process may include the multi-device hub 210 querying one or more IoT servers 206 as to availability to support one or more IoT functions, as specified in the one or more parameters communicated by that given IoT device 202 to the multi-device hub 210 (herein, such query being an "availability request"). For at least one embodiment, such querying may occur in bulk, such that a given query of a given IoT server 206 by the multi-device hub 210 may include an inquiry as to whether the given IoT server 206 will approve access by two or more IoT devices 202 and to one or more IoT application(s) hosted by such given IoT server 206 to support one or more IoT functions. For at least one embodiment, an availability request may be communicated using an indirect and/or networked connection such as provided by the fourth communications link 209a-c and the second communications links 205a-c, or using a direct connection provided by the fifth communications link 211a-c. The availability request may include sufficient information for a given IoT device 202a-c to "register" (as described above) with a given IoT server 206a-c and/or a given IoT application 211a-c hosted thereby. For at least one embodiment, an availability request may include a DevEUI (or the like), an AppEUI (or the like), an AppKey, and user account information (assuming one has already been established with one or more provider(s) of the given IoT server 206a-c and/or IoT application 212a-c). If a user account with the provider(s) has not already been established, the multi-device hub 210 may be configured to establish such account using personal information regarding the user that is contemporaneously provided or has been previously provided by the user. Non-limiting examples of such personal information include residence, payment, and other information. The multi-device hub 210 may be configured to prompt the user for such information, as needed.

It is to be appreciated that the availability request as per Operation 410 may include one or more precursor operations performed by the multi-device hub 210. For example, and for at least one embodiment, the multi-device hub 210 may initiate a web or other search for servers supporting a given IoT function. For at least one embodiment, the multi-device hub 210 may identify the one or more IoT servers 206 to send the availability request based upon one or more device parameters. For at least one embodiment, the multi-device hub 210 may identify the one or more IoT servers 206 to query based on a communications parameter and/or an application parameter.

As per Operation 412, the process may include one or more IoT servers 206 responding to the availability request of Operation 410 (herein, each such response being an "availability response"). For at least one embodiment, an availability response may include an identification of a given IoT servers 206 availability, communications links and/or channels to be utilized, capabilities, security requirements or otherwise.

As per Operation 414, the process may include the multi-device hub 210 processing the one or more received availability responses to select one ore more responding IoT servers 206a-c to support one or more IoT functions requested by the one or more IoT devices 202a-c. It is to be appreciated that a given IoT server 206a-c may be selected to support common IoT functions provided by multiple IoT devices. For example, a home security system may use multiple IoT devices. Per the above Operations, a single IoT server 206 may be selected to provide the IoT home security function to the user(s) of such household by communicating with multiple IoT alarm devices distributed throughout the house. Thus, per the above Operations, the multi-device hub 210 may be configured to query and select from those one or more responding IoT servers 206, the one or more IoT servers 206 which provide the desired one or more IoT home security functions.

As per Operation 416, the process may include the multi-device hub 210 communicating to one or more selected IoT servers 206 a "server acceptance" message. For at least one embodiment, the acceptance message identifies, to the selected IoT server(s) 206, the IoT devices 202 and IoT functions to be supported by the selected IoT server(s) 206. The server acceptance message may identify one or more IoT server(s) as primary servers and/or as back-up servers. Further, as discussed above, registration of the IoT device is deemed to have occurred with each of the IoT servers providing an availability response. Such designation may be suitably stored by the multi-device hub 210 to facilitate rapid reinstallation/resumption of IoT functions when a session is (un)intentionally interrupted, terminated, or otherwise.

As per Operation 418, the process may include identifying one or more gateways 204 and networks 208 that may be used to establish a session between a given IoT device 202 and the selected IoT server(s) 206 to support the given IoT function(s). For at least one embodiment, such identification may be based upon communications parameters provided by the given IoT device(s). For at least one embodiment, such identification may be based on second communications parameters provided by the selected IoT server(s) 206.

As per Operation 420, the process may include the multi-device hub 210, based upon the results determined from Operation 418, communicating a request to one or more gateways 204a-c (herein, each such query being a "gateway query"). The gateway query may be communicated by the multi-device hub 210 to a gateway 204a-c that may support a session between a given IoT device 202 and a given responding IoT server 206 using a network 208 that may be used to communicatively couple the IoT device 202 with the previously selected IoT server 206, using the gateway 204.

For at least one embodiment, the gateway query may include an identification of a DevEUI (or the like), an AppEUI (or the like), an AppKey, and a user account (if one has already been established with a provider of the given network 208a-c). If a user account with the provider of the given network 208a-c has not already been established, the multi-device hub 210 may be configured to establish such account using the user's personal information.

As per Operation 422, one or more queried gateways 204a-c, may respond (each such response being a "gateway response"). Each gateway response may include information that the one or more IoT devices 202 identified in the gateway query may utilize to establish a secure communications link using a network 208a-c accessible by the given responding gateway 204a-c. For at least one embodiment, a single exchange of a gateway query and a gateway response may be used with respect to multiple IoT devices and the establishment of multiple sessions between an IoT device 202 and an IoT server 206.

For at least one embodiment, the gateway response may include a unique key for use by only a given IoT device 202 and common key for use by the multi-device hub 210. The unique key and the common key may be used to generate a unique session key that is used to communicate information between the given IoT device 202 and the selected IoT server 206, using the selected gateway 204 and the selected network 208. Given that a gateway 204 may be used to support multiple sessions between multiple IoT devices 202 and IoT servers 206, it is to be appreciated that each unique key may be generated using a given IoT devices 202 unique AppKey, DevEUI, AppEUI, combinations thereof, or other data known only to the given IoT device 202.

Further, upon receipt of a gateway response, registration of the IoT device is deemed to have occurred with each of the so responding gateways 204 and the network 208 to which they provide access. Such designation may be suitably stored by the multi-device hub 210 to facilitate rapid reinstallation/resumption of IoT functions when a session is (un)intentionally interrupted, terminated, or otherwise.

As per Operation 424a, a "gateway acceptance" message is communicated by the multi-device hub 210 to each IoT device 202 that provided a device parameter per Operation 402. The gateway response may include each of the unique keys and the common keys generated by a given gateway 204. Since the unique keys are generated by the gateway 420 based upon each AppKey associated with a given IoT device 202, and since such AppKey's are not otherwise provided to any other IoT device 202, it is to be appreciated that the unique key may be decipherable by only those devices possessing the AppKey in an unencrypted format, such as the IoT device 202 providing the same (in an encrypted form) as a device parameter per Operation 402.

As per Operation 424b, the gateway acceptance message is communicated by the multi-device hub 210 to the one or more selected IoT servers 206. At this point, each of the IoT device 202, gateway 204, network 208, and IoT server 206 contain sufficient network, communications channel, encryption and other information to establish a secure session between a given IoT device 202 and a given IoT server 206.

As per Operation 426c, the gateway acceptance message is communicated by the multi-device hub 210 to the one or more responding gateways 204. At this point, each of the IoT device 202, responding gateways 204 (and networks 208 associated therewith), and IoT server 206 contain sufficient network, communications channel, encryption and other information to establish a secure session between a given IoT device 202 and a given IoT server 206.

Further, for at least one embodiment, the gateway acceptance message may identify a gateway 204 and a network 208 as primary and one or more second gateways 204 and second networks 208 as back-up. Further, as discussed above, registration of the IoT device with a gateway and a network is deemed to have occurred with each of the gateways (and associated network) providing a gateway response. Such designation may be suitably stored by the multi-device hub 210 to facilitate rapid reinstallation/resumption of IoT functions when a session is (un)intentionally interrupted, terminated, or otherwise.

As per Operation 426, an encrypted test message is communicated by the IoT device 202 to the selected IoT gateway 204 (herein, a "network test message"). As shown, such message is communicated using a first communications link 203 established between the IoT device 202 and the selected gateway 204. For at least one embodiment, the IoT device 202 may also send a notifier to the multi-device hub 210 that the network test message has been sent.

As per Operation 428a, when received and verified as being legitimate or otherwise, a response (a "network install complete") message is communicated by the given gateway 204 to the sending IoT device 202. Per Operation 428b, the network install complete message may also be communicated to the multi-device hub 210. At this instance, installation of the IoT device 202 by and between the given gateway 204 and the given network 208 is deemed complete.

As per Operation 430, a second encrypted test message is communicated by the IoT device 202 to the selected IoT server 206 via the selected IoT gateway 204 and the selected network 208 (herein, a "session test message"). As shown, such message is communicated using a first communications link 203 established between the IoT device 202 and the selected gateway 204 and a second communications link 205 established between the selected gateway 204, using the selected network 208, and the selected IoT device 206. For at least one embodiment, the IoT device 202 may also send a notifier to the multi-device hub 210 that the session test message has been sent.

As per Operation 432a, when received and verified as being legitimate or otherwise, a response (a "session established") message is communicated by the given IoT server 206 back to the given IoT device 202 using the selected network 208 and the selected gateway 204. Per Operation 432b, the session established message may also be communicated to the multi-device hub 210. At this instance, installation of the IoT device 202 with the selected IoT server 206 is deemed complete and use of the multi-device hub 210 is no longer needed.

As per Operation 434, session data is communicated by and between the given IoT device 202 and the selected IoT server, using the selected gateway 204 and network 208. Such session data is communicated in furtherance of the given IoT function and may include any desired information.

Further, it is to be appreciated that for at least one embodiment and when a session is abruptly terminated, interrupted or otherwise operating other than as desired, a new session between an IoT device 202 and a compatible IoT server 206 may be rapidly reestablished by the multi-device hub 210 based upon prior established registrations, IoT server availability response messages, server acceptance messages, gateway response messages, gateway acceptance messages, and the like.

It is to be appreciated that the operations described above and depicted in FIG. 4 are illustrative only and are not intended herein to occur, for all embodiments of the present disclosure, in the order shown, in sequence, or otherwise. One or more operations may be performed in parallel and operations may be not performed, as provided for any given use of an embodiment of the present disclosure.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

The invention claimed is:

1. A system for installing multiple Internet-of-Things (IoT) devices comprising:
    multiple IoT devices;
    a multi-device hub communicatively coupled to each of the multiple IoT devices;
    one or more gateways communicatively coupled to the multi-device hub; and
    one or more IoT servers communicatively coupled to at least one of the one or more gateways;
    wherein the one or more IoT servers execute one or more IoT applications; and
    wherein the multi-device hub is configured to facilitate a bulk installation of the multiple IoT devices by executing one or more non-transient computer instructions for:
        registering, in bulk, each of the multiple IoT devices with at least one of the one or more IoT applications executed by the one or more IoT servers; and
        activating each of the multiple IoT devices for use with at least one of the one or more IoT applications.

2. The system of claim 1,
    wherein a single of the at least one of the one or more IoT servers is used for both the registering and the activating of the multiple IoT devices.

3. The system of claim 1,
    wherein different ones of the at least one or more IoT servers are used for respectively registering and activating the multiple IoT devices.

4. The system of claim 1,
    wherein the non-transient computer instructions for registering further comprise:
        communicating one or more device parameters, for a given IoT device of the multiple IoT devices, to a given IoT application executed by one of the one or more IoT servers with which the given IoT device is to register.

5. The system of claim 4,
    wherein the non-transient computer instructions for registering further comprise:
        processing the one or more device parameters received from each of the multiple IoT devices to associate at least one of a common communication parameter and a common application parameter; and
        based on the association, identifying common IoT devices; and
    wherein results arising from the processing are used by the multi-device hub to identify potential IoT applications executed by the one or more potential IoT servers, with which the common IoT devices may register.

6. The system of claim 5,
    wherein the non-transient computer instructions for registering further comprise:
        communicating an availability request to the potential IoT applications;
    wherein the availability request identifies an IoT function for the common IoT devices; and
    wherein the IoT function is specified in the one or more device parameters for each of the common IoT devices.

7. The system of claim 5,
wherein the non-transient computer instructions for registering further comprise:
executing a search for IoT applications that supports the IoT function; and
wherein a result of the search includes an identification of at least one of the potential IoT applications.

8. The system of claim 6,
wherein the IoT function is associated with the potential IoT applications executed by the one or more potential IoT servers.

9. The system of claim 6,
wherein the one or more potential IoT servers are configured to execute non-transient server computer instructions for registering each of the common IoT devices with the potential IoT applications based upon information provided in the availability request.

10. The system of claim 1,
wherein the one or more device parameters are received by the multi-device hub from each of the one more IoT devices.

11. The system of claim 10,
wherein the one or more device parameters include at least one of a device identifier (DevEUI), an application identifier (AppEUI) and an application key (AppKey).

12. The system of claim 1,
wherein the non-transient computer instructions for registering further comprise:
receiving an availability response from at least one of the one or more potential IoT servers;
selecting, from the received availability responses, one of the one or more potential IoT servers;
designating the selected one of the one or more potential IoT servers as an accepted IoT server; and
communicating a server acceptance to the accepted IoT server; and
wherein the server acceptance identifies, to the accepted IoT server, the one or more common IoT devices and the IoT functions to be supported by the accepted IoT server.

13. A system for installing multiple Internet-of-Things (IoT) devices comprising:
multiple IoT devices;
a multi-device hub communicatively coupled to each of the multiple IoT devices;
one or more gateways communicatively coupled to the multi-device hub; and
one or more IoT servers communicatively coupled to at least one of the one or more gateways; and
wherein the one or more IoT servers execute one or more IoT applications;
wherein the multi-device hub is configured to facilitate a bulk installation of the multiple IoT devices by executing one or more non-transient computer instructions comprising:
registering, in bulk, each of the multiple IoT devices with at least one of the one or more IoT applications; and
activating each of the multiple IoT devices for use with at least one of the one or more IoT applications by further executing computer instructions comprising;
querying the one or more gateways;
receiving one or more gateway responses from the one or more gateways queried;
selecting, based on the one or more gateway responses, a selected gateway; and
communicating a gateway acceptance to each of the selected gateway, a selected IoT application, and a selected IoT device selected from the multiple IoT devices.

14. The system of claim 13,
wherein each of the one more gateway responses includes:
a unique key for providing to a given one of the multiple IoT devices; and
a common key for providing to the multi-device hub and each of the multiple IoT devices to be coupled with the selected gateway.

15. The system of claim 14,
wherein the gateway acceptance includes:
an identification of the selected gateway, the selected IoT application and the selected IoT device;
the unique key and the common key;
an identification of a selected network; and
wherein the selected network communicatively couples the selected gateway with the selected IoT application.

16. The system of claim 15,
wherein information provided in the gateway acceptance facilitates secure communications between the selected IoT device and the selected IoT application using the selected gateway and the selected network.

17. The system of claim 15,
wherein the selected IoT application is selected during registering of each of the multiple IoT devices with at least one of the one or more IoT applications.

18. The system of claim 13,
wherein the multi-device hub is communicatively coupled to at least one of the multiple IoT devices using at least one of a near field communication (NFC) link, a Wi-Fi protected setup (WPS) process, a personal identification number, infra-red signals, a code selection process, and a physical connection.

19. The system of claim 13,
wherein the one or more IoT applications are communicatively coupled to at least one of the one or more IoT gateways via a network; and
wherein, upon completion of installation, each of the multiple IoT devices are communicatively coupled to a selected IoT application, selected from the one or more IoT applications, via at least one of the one or more gateways and the network.

20. A method for installing multiple IoT devices comprising:
registering, in bulk, each of multiple IoT devices with at least one of one or more IoT servers; and
activating each of the multiple IoT devices for use with at least one of the one or more IoT servers by operations comprising:
querying the one or more gateways;
receiving one or more gateway responses from the one or more gateways queried;
selecting, based on the one or more gateway responses, a selected gateway; and
communicating a gateway acceptance to each of the selected gateway, a selected IoT server, and a selected IoT device selected from the multiple IoT devices; and
wherein the one or more IoT servers execute one or more IoT applications.

21. A multi-hub device for facilitating multiple IoT device installation comprising:
- a communications module;
- a storage device;
- a processor; and
- a data bus communicatively coupling the each of the communications module, the storage device and the processor;
- wherein the processor is configured to execute non-transient computer instructions for facilitating bulk installation of the multiple IoT devices by:
- registering, in bulk, each of the multiple IoT devices with at least one of the one or more IoT servers; and
- activating each of the multiple IoT devices for use with at least one of the one or more IoT servers; and
- wherein the one or more IoT servers execute one or more IoT applications.

\* \* \* \* \*